(12) United States Patent
Brenner

(10) Patent No.: US 7,228,243 B2
(45) Date of Patent: Jun. 5, 2007

(54) IMPLEMENTING A HIGH RESOLUTION MONOTONIC SYSTEM CLOCK

(75) Inventor: Larry Bert Brenner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/232,763

(22) Filed: Sep. 22, 2005

(65) Prior Publication Data

US 2007/0067122 A1    Mar. 22, 2007

(51) Int. Cl.
*G06F 19/00* (2006.01)
(52) U.S. Cl. .......................................... 702/61; 713/322
(58) Field of Classification Search ................ 702/193, 702/182–185, 79, 176, 61, 188; 713/322
See application file for complete search history.

(56) References Cited

U.S. PATENT DOCUMENTS 5,826,066 A    10/1998    Jardine et al.

*Primary Examiner*—Edward Raymond
(74) *Attorney, Agent, or Firm*—Duke W. Yee; Marilyn Smith Dawkins; Wayne P. Bailey

(57) ABSTRACT

An application implementing a high resolution monotonic system clock is provided. A kernel increments a value called a generation number. The generation number is used to determine what state the high and low resolution time values are in. The kernel next stores a low resolution time value. Then, if a time adjustment is occurring, the kernel updates the high resolution time value by updating the origin date. The kernel then increments the generation number a second time. The providing application receives a request for time from another application. The providing application determines a first value for the generation number and compares a low resolution time value and high resolution time value and determines the maximum value of the two. The providing application then gets a second value for the generation number and compares the second value of the generation number to the first value of the generation number. If the two values of the generation number are the same, the providing application returns the maximum value to the requesting application.

19 Claims, 3 Drawing Sheets

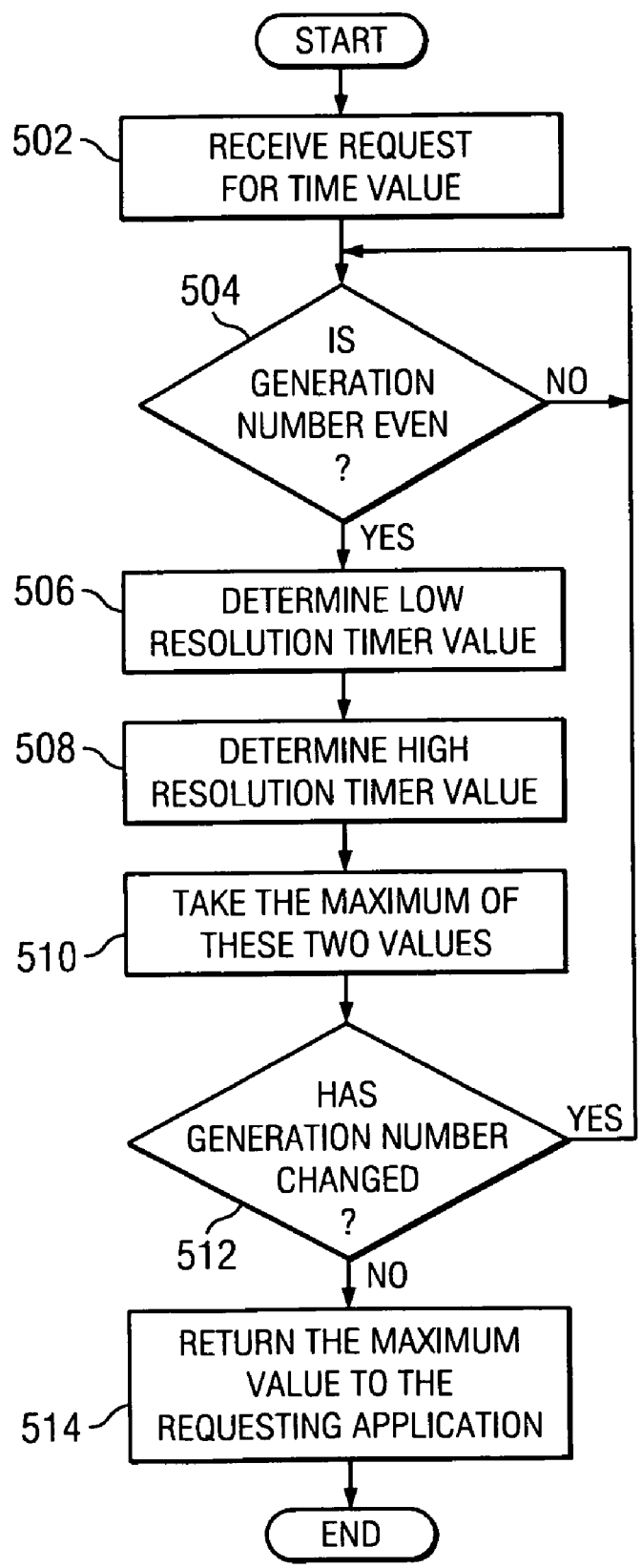

IMPLEMENTING A HIGH RESOLUTION MONOTONIC SYSTEM CLOCK

BACKGROUND OF THE INVENTION

1. Field of the Invention

The present invention relates in general to a data processing system and, in particular, to a method, system, and computer program product for implementing a high resolution monotonic system clock.

2. Description of the Related Art

On computing systems with a high resolution time of day clock that is routinely adjusted to synchronize system time with a network standard time, applications can observe that time has moved backwards. This happens typically as a result of the normal operation of the network time protocol. On many computer systems, such as the AIX system, for example, the time adjustment must be made in discrete increments or decrements to a real time clock.

To minimize the visibility of such time corrections, systems generally break the required correction into a larger number of smaller sub-corrections. In this fashion, the time change is performed more gradually, but over a relatively long period of time. For example, on an AIX system, the situation of setting the time of day backwards is handled by setting the time of day back one millisecond every ten milliseconds until the system time has been corrected. For example, a two millisecond correction applied in this fashion becomes a discrete 1 millisecond correction performed at the next regularly scheduled timer tick, which occurs every ten milliseconds. Then, ten milliseconds after the first correction was made, at the time of the next timer tick, the second one millisecond correction is applied and the total correction is complete.

On systems without a high resolution clock, the time correction does not cause a problem. Such systems rely on being able to have regularly scheduled timer ticks, such as at ten millisecond intervals, and keep track of the time of day by simply adding ten milliseconds to a global time value at each tick. When time is being adjusted backwards, systems such as these simply add nine milliseconds to the global value at each tick until a total backwards time correction has been applied. Any program that references such a system timer can never observe time going backwards. It can only observe time going forward, albeit at varying rates, including standing still.

Once, however, a high resolution hardware clock is added, such as the timebase register on POWER/PC systems, for example, any program that observes the current time more frequently than every millisecond can easily observe when time has been adjusted backwards. Unfortunately, observing this occurrence frequently causes programs to fail.

One solution to this problem would be to provide a low resolution time value optionally to any application that requests it. The application will not see time going backwards anymore, but it will see time standing still for ten milliseconds at a time, and then jumping forward. This solution is not always practical.

Another solution is to arithmetically adjust the high resolution time value through an additional software layer which could accurately prorate the correction over an interval before the discrete correction is made to the hardware clock. However, there are numerous implementation difficulties with this solution, including the processing time necessary to do the sixty-four bit divides and multiplies that this requires, which are expensive operations when emulated on thirty-two bit hardware.

SUMMARY OF THE INVENTION

The present invention provides a method, system, and computer program product for creating a high resolution monotonic system clock. A low resolution timer value is compared to a high resolution timer value to form a comparison. The maximum value of the comparison is determined and is returned in response to a request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates the operation of an application program providing a monotonic view of time, in accordance with an exemplary embodiment of the present invention.

DETAILED DESCRIPTION OF THE PREFERRED EMBODIMENT

Figure 1:
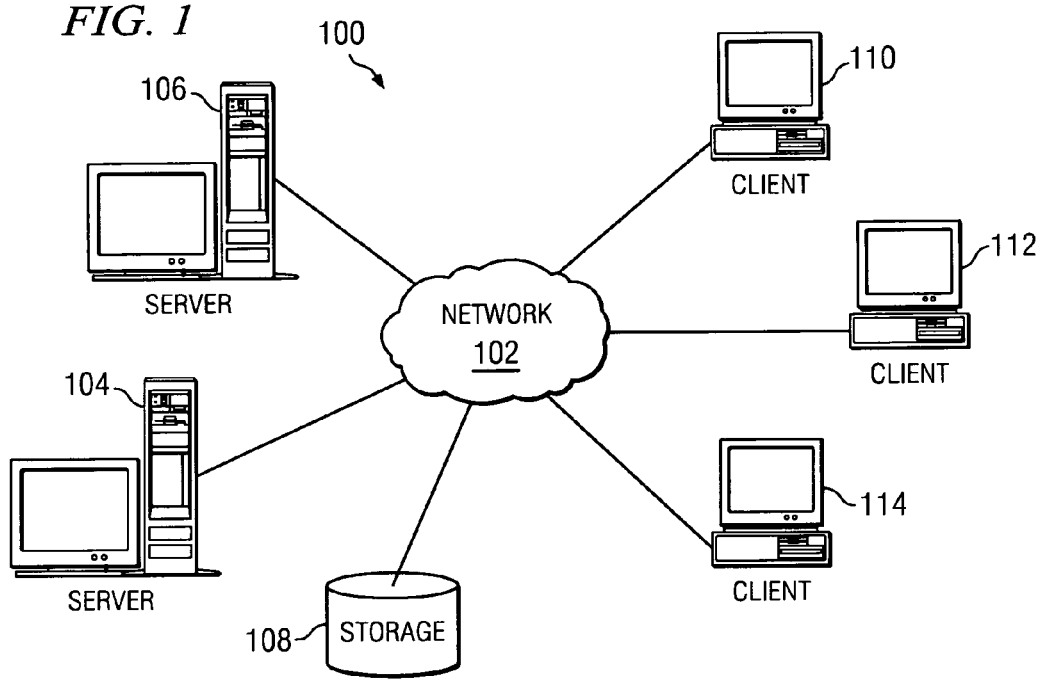
FIG. 1 is a pictorial representation of a network of data processing systems in which exemplary aspects of the present invention may be implemented.
Figure 2:
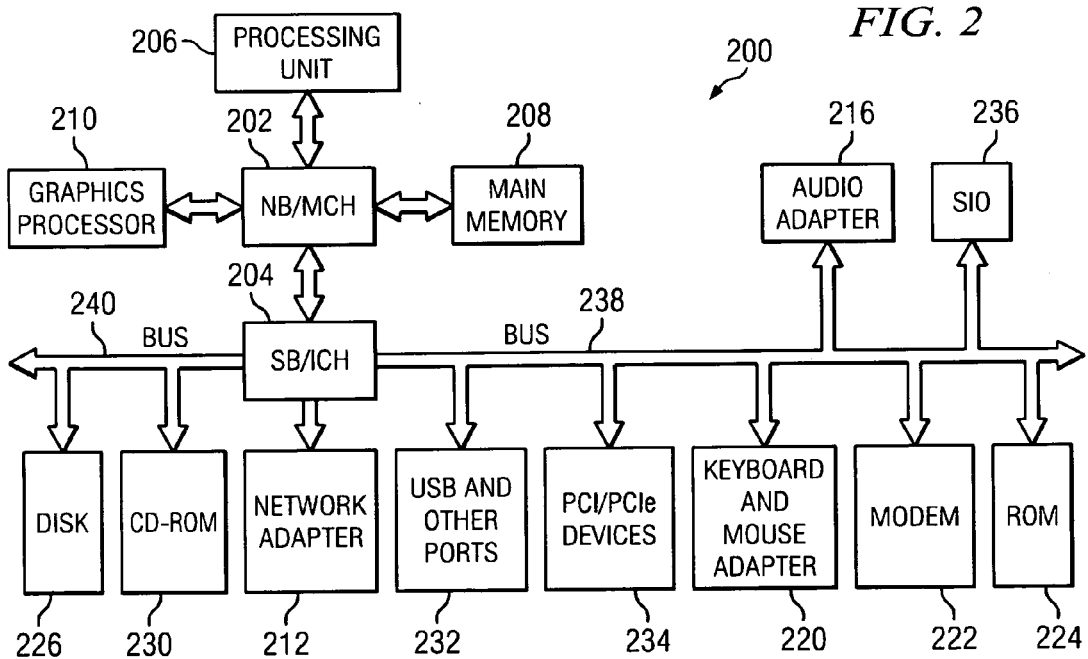
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft Windows XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

In order to solve the problem of time moving backwards that occurs with a high resolution clock, an illustrative example of the present invention proposes a new high resolution monotonic clock comprised of the maximum value of a low resolution clock and the pre-existing high resolution clock. This new high resolution monotonic clock does not rely on expensive arithmetic operations. The new high resolution monotonic clock gives the same result as the high resolution clock, most of the time, and only shows time standing still for one millisecond out of every ten milliseconds, when a backwards correction is actually in progress.

The high resolution time of day is actually the sum of the hardware clock register plus the "date origin" which the kernel maintains. When the system is booted, the clock register is initialized to zero, and the date origin is initialized to the actual time of day of the initial program load.

Adjustments to the time of day in an exemplary embodiment are made by updating the date origin rather than by updating the value in the hardware clock register.

In an exemplary embodiment of the present invention, a low resolution time is a value that is as precise as the high resolution clock. The low resolution time represents the precise time of day as represented by the high resolution clock at the end of the previous ten millisecond tick interval. Therefore, the low resolution time does not lag the high resolution time at the instant the ten millisecond interval begins.

Additionally, kernel data needs to be made atomically available to the application layer to ensure correct results. In particular, the kernel must update the low resolution time in publicly readable memory and update the publicly readable date origin in such a way as to guarantee that a consistent image of both values is used when taking the maximum value, as detailed above. A kernel lock cannot be used for these purposes, as it may be unacceptable to allow user code any capability to force kernel code to wait for it. In such a case, a malicious user could use such a lock to stop the kernel indefinitely.

Therefore, in order to provide a consistent view of the combination of kernel data comprising both high and low resolution times of day, an exemplary embodiment of the present invention employs a "generation number" approach instead of a kernel lock. The generation number is initialized to zero when the system is booted with the intent that the generation number will be even whenever the publicly viewable kernel data is in a consistent state. Thus the kernel exports not only the kernel's view of a low resolution timer and the date origin in publicly readable memory, but also a generation number as well. The hardware clock is, of course, also visible in user mode.

On each regularly scheduled ten millisecond timer tick, the kernel performs several functions. The kernel increments the generation number and stores a low resolution timer value. The kernel also possibly updates the date origin, which effectively updates the high resolution time value. The kernel then increments the generation number again. In an exemplary embodiment of the present invention, the kernel updates the high resolution timer value only when the generation number is an odd value.

The kernel is not aware of when or if a user application reads the new composite time value. Also, the kernel never stops to serialize with the application layer. This avoids the malicious locking problem.

In another exemplary embodiment, the kernel is optimized to update the generation number only when a hardware clock update is to be applied.

The application providing the new composite time value, called the providing application, resides in the user application layer. The providing application has to wait until the generation number is even, as in the present exemplary embodiment; the kernel is possibly updating data when the generation number is odd. When the providing application determines that the generation number is an even number, the providing application then reads both the kernel's low resolution time value and determines the high resolution time value. The providing application then determines the maximum of the two values and verifies that the generation number has not changed. If the generation number has changed, then the providing application must start the process over again, as it is possible that the kernel information has been updated. If the generation number has not changed, then the providing application returns this maximum value to the calling application.

As the providing application resides in the user layer and is responsible for all serialization, the providing application may have to spin, or repeat its computation, if the kernel data has, or may have, changed. Therefore, in an exemplary embodiment of the present invention, a composite view of time is only returned to those applications which specifically request it. Thus, compatibility and lower overhead is maintained for those applications that don't require the monotonic view of time.

Figure 3:
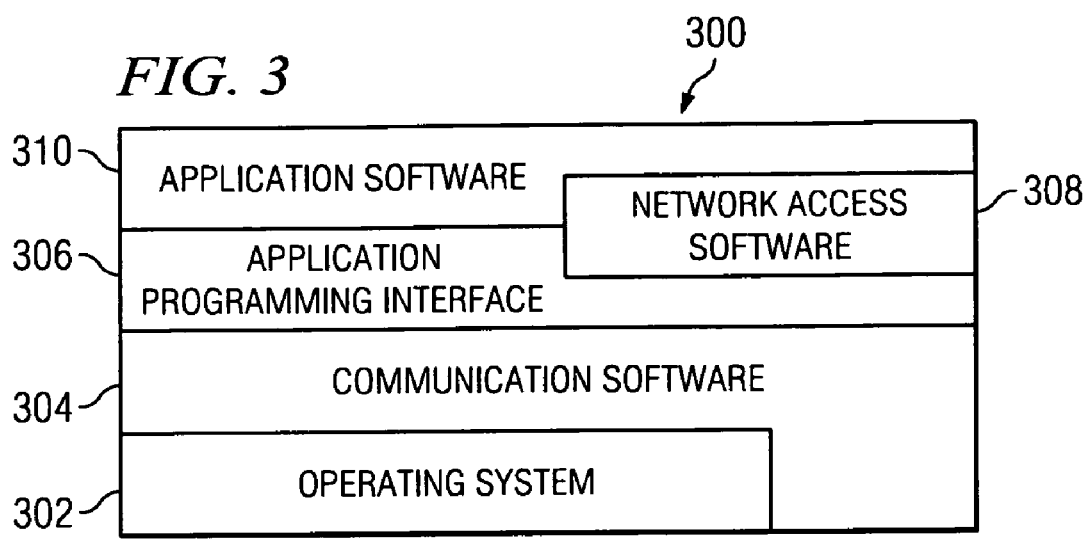
FIG. 3 is a block diagram depicting typical software architecture for a server-client system in which exemplary aspects of the present invention may be implemented.

Turning to FIG. 3, typical software architecture for a server-client system is depicted in which exemplary aspects of the present invention may be implemented. At the lowest level, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Application software 310 represents any number of software applications designed to react to data through the communications port to provide the desired functionality the user seeks, such as an application for providing a composite time value as described above and illustrated in FIG. 5. Applications at this level may include those necessary to handle data, video, graphics, photos or text, which can be accessed by users of the Internet. The mechanism of the present invention may be implemented within communications software 304 in these examples.

Figure 4:
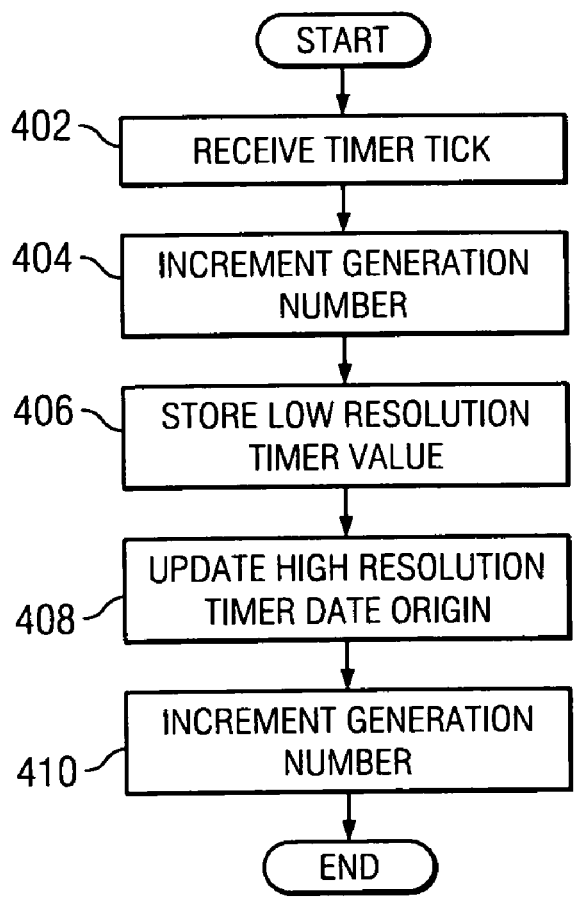
FIG. 4 illustrates operation of a kernel in accordance with an exemplary embodiment of the present invention.

FIG. 4 illustrates operation of a kernel in accordance with an exemplary embodiment of the present invention. The operation begins when the kernel receives a timer tick (step 402). The kernel increments the generation number, making it odd (step 404). The kernel next stores the current high resolution time as the low resolution time value in publicly readable memory (step 406). If a time of day adjustment is in progress, the kernel next effectively updates the high resolution time by updating the date origin as necessary to implement a time of day change (step 408). The kernel then increments the generation number again, making it even (step 410), and the process ends. In an exemplary embodiment, the kernel updates to global memory are seen by the application layer as having been made in the specified sequence.

FIG. 5 illustrates the operation of an application program providing a combined view of time, in accordance with an exemplary embodiment of the present invention. The operation begins when the application program receives a request for the time value from another application (step 502). The application program determines if the generation number is even (step 504). If the generation number is not even (a no output to step 504), the application program waits until the generation number is even, repeating step 504. If the generation number is even (a yes output to step 504), the application program reads the kernel's low resolution time value (step 506). The application program reads the kernel's date origin which it adds to the value in the hardware clock register to form the high resolution time value (step 508). The application program takes the maximum of these two values (step 510). The application program then determines if the generation number has changed (step 512). If the generation number has changed (a yes output to step 512), the application program must start over again, as kernel data has possibly changed, repeating step 504. If the generation number has not changed (a no output to step 512), the application program returns the maximum value to the requesting application (step 514) and the operation ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating a high resolution monotonic system clock, the computer implemented method comprising:
   comparing a low resolution time value to a high resolution time value to form a comparison, wherein the low resolution time value is a time of day as indicated by the high resolution time value at the end of an immediately preceding time interval;
   determining a maximum value of the comparison between the low resolution time value and the high resolution time value; and
   returning the low resolution time value as the maximum value of the comparison, in response to a request, when the low resolution time value is greater than the high resolution time value due to the high resolution time value being adjusted to synchronize time.

2. The computer implemented method of claim 1, wherein the request is a request for the maximum value of the comparison.

3. A computer implemented method for creating a high resolution monotonic system clock, the computer implemented method comprising:
   comparing a low resolution time value to a high resolution time value to form a comparison;
   determining a maximum value of the comparison;
   returning the maximum value of the comparison in response to a request;
   incrementing a generation number, wherein the generation number indicates a state of the high and low resolution time values;
   storing the low resolution time value;
   determining whether to update the high resolution time value; and
   incrementing the generation number.

4. The computer implemented method of claim 3, further comprising:
   updating the high resolution time value by altering the date origin, wherein the date origin is a time of day of an initial program load.

5. The computer implemented method of claim 3, further comprising:
   determining a first value for the generation number, wherein the first value for the generation number is determined prior to comparing the low resolution timer value to the high resolution timer value to form the comparison; and
   determining a second value for the generation number, wherein the second value for the generation number is determined after determining the maximum value of the comparison.

6. The computer implemented method of claim 5, wherein the maximum value of the comparison is returned in response to the request only if the first value for the generation number and the second value for the generation number are equal.

7. The computer implemented method of claim 3, wherein the steps of comparing a low resolution time value to a high resolution time value to form a comparison; determining a maximum value of the comparison; and returning the maximum value of the comparison in response to a request, are only performed when the generation number is an even number.

8. A computer program product comprising a computer usable medium including computer usable program code for creating a high resolution monotonic system clock, said computer program product comprising:

computer usable program code for comparing a low resolution time value to a high resolution time value to form a comparison, wherein the low resolution time value is a time of day as indicated by the high resolution time value at the end of an immediately preceding time interval;

computer usable program code for determining a maximum value of the comparison between the low resolution time value and the high resolution time value; and computer usable program code for returning the low resolution time value as the maximum value of the comparison, in response to a request, when the low resolution time value is greater than the high resolution time value due to the high resolution time value being adjusted to synchronize time.

9. The computer program product of claim 8, wherein the request is a request for the maximum value of the comparison.

10. The computer program product of claim 8, wherein the low resolution time value is a time of day as indicated by the high resolution time value at the end of an immediately preceding time interval.

11. A computer program product comprising a computer usable medium including computer usable program code for creating a high resolution monotonic system clock, said computer program product comprising:

computer usable program code for comparing a low resolution time value to a high resolution time value to form a comparison;

computer usable program code for determining a maximum value of the comparison;

computer usable program code for returning the maximum value of the comparison in response to a request;

computer usable program code for incrementing a generation number, wherein the generation number indicates a state of the high and low resolution time values;

computer usable program code for storing a low resolution time value;

computer usable program code for determining whether to update the high resolution time value; and computer usable program code for incrementing the generation number.

12. The computer program product of claim 11, further comprising:

computer usable program code for updating the high resolution time value by altering the date origin, wherein the date origin is a time of day of an initial program load.

13. The computer program product of claim 11, further comprising:

computer usable program code for determining a first value for the generation number, wherein the first value for the generation number is determined prior to comparing the low resolution time value to the high resolution time value to form the comparison; and computer usable program code for determining a second value for the generation number, wherein the second value for the generation number is determined after determining the maximum value of the comparison.

14. The computer program product of claim 13, wherein the computer usable program code returns the maximum value of the comparison in response to the request only if the first value of the generation number and the second value of the generation number are equal.

15. The computer program product of claim 11, wherein the computer usable program code for comparing a low resolution time value to a high resolution time value to form a comparison; determining a maximum value of the comparison; and returning the maximum value of the comparison in response to a request, is responsive to the generation number being an even number.

16. A data processing system for creating a high resolution monotonic system clock, the data processing system comprising:

a storage device, wherein the storage device stores computer usable program code; and a processor, wherein the processor executes the computer usable program code to compare a low resolution time value to a high resolution time value to form a comparison, wherein the low resolution time value is a time of day as indicated by the high resolution time value at the end of an immediately preceding time interval; determine a maximum value of the comparison between the low resolution time value and the high resolution time value; and return the low resolution time value as the maximum value of the comparison, in response to a request, when the low resolution time value is greater than the high resolution time value due to the high resolution time value being adjusted to synchronize time.

17. The data processing system of claim 16, wherein the low resolution time value is a time of day as indicated by the high resolution time value at the end of an immediately preceding time interval.

18. A data processing system for creating a high resolution monotonic system clock, the data processing system comprising:

a storage device, wherein the storage device stores computer usable program code; and a processor, wherein the processor executes the computer usable program code to compare a low resolution time value to a high resolution time value to form a comparison; determine a maximum value of the comparison; return the maximum value of the comparison in response to a request; increment a generation number, wherein the generation number indicates a state of the high and low resolution time values; store a low resolution time value; determine whether to update the high resolution time value; and increment the generation number.

19. The data processing system of claim 18, wherein the processor only executes the computer usable program code for comparing a low resolution time value to a high resolution time value to form a comparison; determining a maximum value of the comparison; and returning the maximum value of the comparison in response to a request, when the generation number is an even number.

* * * * *